United States Patent
Gautam et al.

(10) Patent No.: US 10,544,303 B2
(45) Date of Patent: Jan. 28, 2020

(54) HIGH PERFORMANCE POLYMER COMPOSITION FOR MOBILE ELECTRONIC DEVICES

(71) Applicant: SOLVAY SPECIALTY POLYMERS USA, LLC., Alpharetta, GA (US)

(72) Inventors: Keshav Gautam, Duluth, GA (US); Mohammad Jamal El-Hibri, Atlanta, GA (US)

(73) Assignee: SOLVAY SPECIALITY POLYMERS USA, LLC., Alpharetta, GA (US)

( * ) Notice: Subject to any disclaimer, the term of this patent is extended or adjusted under 35 U.S.C. 154(b) by 253 days.

(21) Appl. No.: 14/366,713

(22) PCT Filed: Dec. 17, 2012

(86) PCT No.: PCT/EP2012/075796
§ 371 (c)(1),
(2) Date: Jun. 19, 2014

(87) PCT Pub. No.: WO2013/092492
PCT Pub. Date: Jun. 27, 2013

(65) Prior Publication Data
US 2014/0357782 A1 Dec. 4, 2014

Related U.S. Application Data

(60) Provisional application No. 61/578,338, filed on Dec. 21, 2011.

(51) Int. Cl.
- *C08L 71/00* (2006.01)
- *C08K 7/14* (2006.01)
- *C08L 81/06* (2006.01)
- *G06F 1/16* (2006.01)

(52) U.S. Cl.
CPC ............. *C08L 71/00* (2013.01); *C08K 7/14* (2013.01); *C08L 81/06* (2013.01); *G06F 1/1613* (2013.01); *C08G 2650/40* (2013.01); *C08L 2203/20* (2013.01)

(58) Field of Classification Search
CPC ...... C08L 71/00; C08L 81/06; C08L 2203/20; C08K 7/14; G06F 1/1613; C08G 2650/40
USPC .......................................................... 524/494
See application file for complete search history.

(56) References Cited

U.S. PATENT DOCUMENTS

| | | |
|---|---|---|
| 4,624,997 A | 11/1986 | Robeson et al. |
| 4,713,426 A | 12/1987 | Harris et al. |
| 4,804,697 A | 2/1989 | Saito et al. |
| 4,908,427 A | 3/1990 | Rostami |
| 4,957,962 A | 9/1990 | Winkler et al. |
| 5,008,364 A | 4/1991 | Ittemann et al. |
| 5,916,958 A | 6/1999 | Kelly et al. |
| 7,612,997 B1 * | 11/2009 | Diebel ................. G06F 1/1632 361/679.41 |
| 2002/0072335 A1 | 6/2002 | Watanabe |
| 2005/0016764 A1 * | 1/2005 | Echigo ................. H05K 3/4069 174/256 |
| 2009/0048379 A1 | 2/2009 | Weinberg et al. |
| 2010/0291381 A1 | 11/2010 | Elia et al. |

FOREIGN PATENT DOCUMENTS

| | | |
|---|---|---|
| DE | 3843438 A1 | 6/1990 |
| EP | 1884538 A1 | 2/2008 |
| EP | 2067823 A1 | 6/2009 |
| WO | WO 2007107519 A1 | 9/2007 |
| WO | WO 2008116939 A2 | 10/2008 |
| WO | WO 2009/034086 A2 | 3/2009 |
| WO | WO 2009/045431 A1 | 4/2009 |

OTHER PUBLICATIONS

Murphy J., in "Additives for Plastics Handbook", 2nd Edition, 2001, Chapter 5.2.3., p. 43-48—Elsevier Advanced Technology.

* cited by examiner

*Primary Examiner* — Ling Siu Choi
*Assistant Examiner* — Ronald Grinsted
(74) *Attorney, Agent, or Firm* — Jarrod N. Raphael

(57) ABSTRACT

The present invention relates to mobile electronic devices comprising at least one structural part made of a polymer composition (C) comprising at least one polyaryletherketone (PAEK), at least one aromatic sulfone polymer (SP) such as polyphenylsulfone (PPSU), polyethersulfone (PESU), polysulfone (PSU) or mixture thereof, and at least one reinforcing filler.

13 Claims, No Drawings

HIGH PERFORMANCE POLYMER COMPOSITION FOR MOBILE ELECTRONIC DEVICES

This application is a U.S. national stage entry under 35 U.S.C. § 371 of International Application No. PCT/EP2012/075796, filed Dec. 17, 2012, which claims priority to U.S. application No. 61/578,338, filed on Dec. 21, 2011, the whole content of each of these applications being incorporated herein by reference for all purposes.

TECHNICAL FIELD

The present invention relates to high performance polymer compositions very well suited for the manufacture of small parts. In particular, the present invention relates to mobile electronic device comprising at least one part made of a polymer composition comprising at least one polyaryletherketone, at least one sulfone polymer and at least one reinforcing filler.

BACKGROUND ART

Nowadays, mobile electronic devices such as mobile phones, personal digital assistants (PDAs), laptop computers, MP3 players, and so on, are in widespread use around the world. While a lot of progress has been made in making smaller electronic devices, there is more and more demand for higher quality and greater serviceability of these mobile electronic devices. Much has been gained from the miniaturization of electronic components and the development of more efficient batteries; in only a couple of decades, mobile communications systems have gone from analogue to digital, and at the same time the dimensions of the communication terminals have gone from briefcase-size to the pocket-size phones of today. Mobile electronic devices are also getting smaller and smaller for even more portability and convenience, while at the same time becoming increasingly capable of performing more advanced functions and services, both due to the development of the devices and the network systems.

This evolution comes with a number of conflicting requirements which are all considered to be an important factors for the end customer. Basically, the device should be as small and light-weight as possible. Furthermore, it should provide more and more advanced functions, have a long battery life, and have a user-friendly interface. Still, there is only so much space in an electronic device, and, in order to be competitive the elements of the device must be carefully designed, assembled and packaged.

While for convenience sake, it is often desirable that these devices be small and lightweight, they still need to possess a certain structural strength so that they will not be damaged in normal handling and occasional drops. Thus, usually built into such devices are structural parts whose primary function is to provide strength and/or rigidity and/or impact resistance to the device, and perhaps also provide mounting places for various internal components of the device and/or part or all of the mobile electronic device case (outer housing). Because of the strength and/or rigidity requirements for these members they are usually made of metal, sometimes a low density metal such as magnesium or aluminum. However use of metals for these parts has drawbacks. Some of these less dense metals such as magnesium are somewhat expensive, and manufacturing the often small and/or intricate parts needed is expensive. The use of metals also sometimes limits design flexibility.

While synthetic resins can overcome some of the limitations of metals such as making intricate parts and lower density, but typical they do not usually have the strength and/or stiffness to be structural parts in mobile electronic devices. As a result, improved structural parts for mobile electronic devices are needed.

US 2010/0291381 relates to structural members for portable electronic devices comprising synthetic resin compositions whose surface is coated at least partially by a metal. A long list of synthetic resins is disclosed.

Indeed, polymer compositions have been used for a long period in the manufacture of mobile electronic devices. Polyamides such as Nylon 6 or Nylon 6,6, and polyesters such as PET or polyolefins have been widely used.

However, as various technologies evolve and improve at a very high pace, the commodity resins exemplified above do not fulfill the market needs anymore. The manufacturing technology must therefore evolve and improve to meet the increased manufacturing demands. These increased demands include, as explained above, lighter and smaller structures but with comparable or even improved overall properties. This miniaturization thus involves the use of higher performance materials for the manufacture of parts of mobile electronic devices (such as structural parts).

The main properties required for the manufacture of parts of mobile electronic devices include good flow properties, high impact strength, high stiffness (and in particular high flexural modulus), good elongation properties and chemical resistance (and in particular resistance to acid environments). Also, in some instances, if the structural parts of mobile electronic devices have complicated shapes that may warp during formation, as in injection molding, it may be advantageous to use a synthetic resin composition which is specifically designed to have low warpage.

However, there is a great demand to reduce the overall costs of the mobile electronic devices as well and the price of the high performance materials should also be therefore maintained within acceptable ranges.

Therefore, a new mobile electronic device and structural parts thereof are desired in order to overcome the above-described shortcomings.

SUMMARY OF INVENTION

The present invention thus relates to a mobile electronic device comprising at least one structural part made of a polymer composition (C) comprising:
- at least one polyaryletherketone (PAEK);
- at least one aromatic sulfone polymer (SP), and
- at least one reinforcing filler.

The Applicant has surprisingly found that the above mentioned polymer composition (C) features good flow properties and low warpage, which renders the formation of structural parts made out of the polymer composition (C) very easy, whichever manufacturing process is used. In addition, polymer composition (C) features also high impact strength, high stiffness, good elongation and very good chemical resistance. For all the above mentioned reasons, polymer composition (C) is a perfect candidate for the manufacture of structural parts of mobile electronic devices.

DESCRIPTION OF PREFERRED EMBODIMENTS

By "mobile electronic device" is meant an electronic device that is designed to be conveniently transported and used in various locations. Representative examples of portable electronic devices include mobile telephones, personal digital assistants, laptop computers, tablet computers, radios, cameras and camera accessories, watches, calculators, music players, global positioning system receivers, portable games, hard drives and other electronic storage devices, and the like.

By "structural part of a mobile electronic device" is meant any structural part including the external structural parts of the mobile electronic device such as the housing, but also the internal structural parts that may often not be visible, that is they may be in the interior of the mobile electronic device, not normally visible in the configuration in which the mobile electronic device is normally used (although they may be visible if the mobile electronic device is disassembled).

The structural part may be in any shape so that it performs its desired function. For example it may be a full or partial "frame" around the periphery of the mobile electronic device, it may in the form of one or more separate beams and/or a number of beams in the form of a latticework, or any combination of these. It may have formed into it items such as mounting holes or other fastening devices such as snap fit connectors between itself and other items of the mobile electronic device such as circuit boards, microphones, speakers, displays, batteries, covers, housings, electrical or electronic connectors, hinges, antennas, switches, and switchpads. Mobile electronic devices in which the present structural parts are useful include cell phones, personal digital assistants (PDAs), music storage and listening devices, portable DVD players, electrical multimeters, mobile electronic game consoles, mobile personal computers (such as notebook computers, etc.).

The mobile electronic device comprising at least one structural part according to the present invention is made of a polymer composition (C) comprising at least three components, i.e. at least one polyaryletherketone (PAEK), at least one aromatic sulfone polymer (SP) and at least one reinforcing filler. Those three components will be detailed hereafter.

The Polyaryletherketone

Firstly, the term "polyaryletherketone (PAEK)" is intended to denote for the purpose of the present invention any polymer, comprising recurring units, more than 50% moles of said recurring units are recurring units ($R_{PAEK}$) comprising a Ar—C(=O)—Ar' group, with Ar and Ar', equal to or different from each other, being aromatic groups. The recurring units ($R_{PAEK}$) are generally selected from the group consisting of formulae (J-A) to (J-O), herein below:

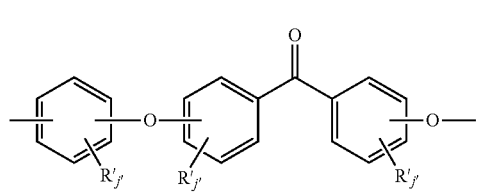 (J-A)

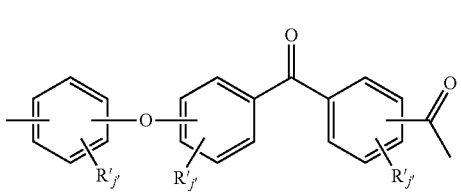 (J-B)

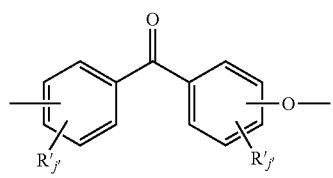 (J-C)

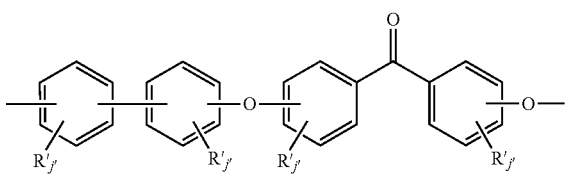 (J-D)

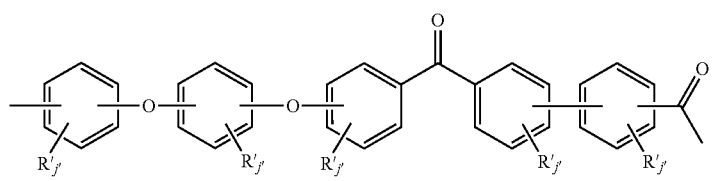 (J-E)

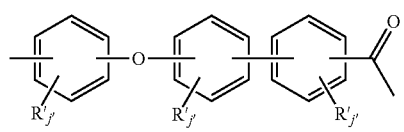 (J-F)

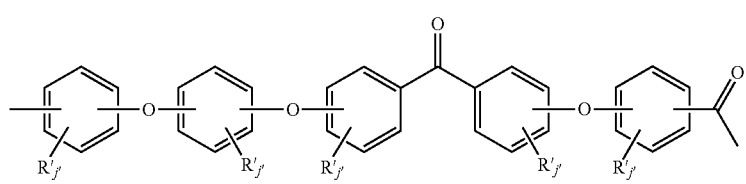 (J-G)

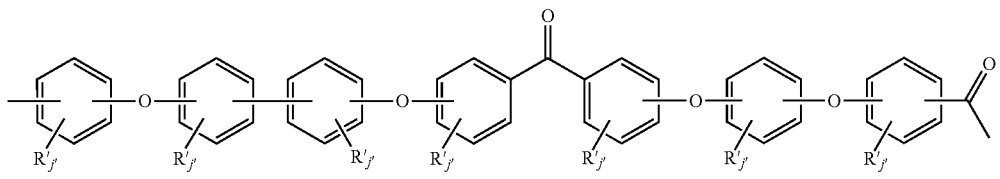 (J-H)

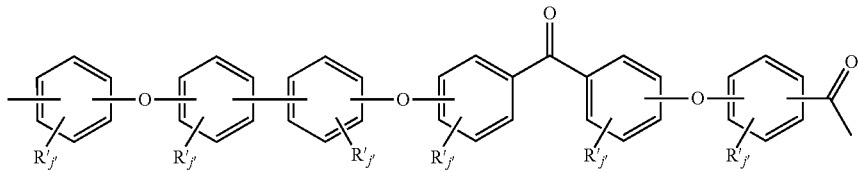 (J-I)

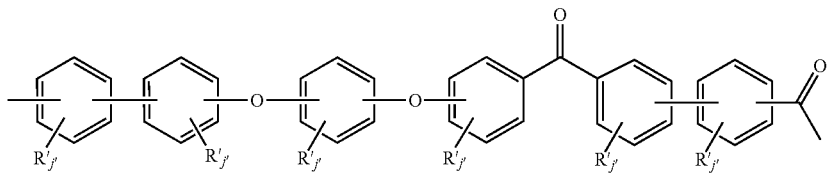 (J-J)

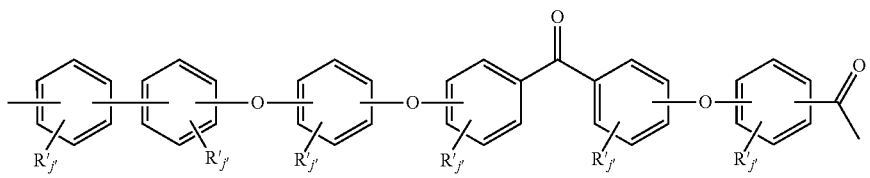 (J-K)

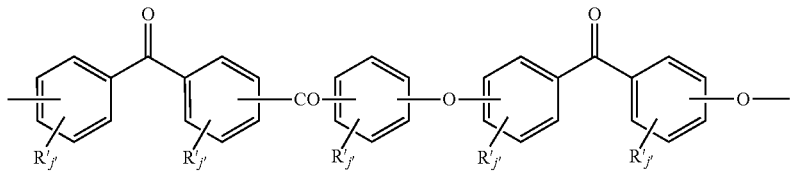 (J-L)

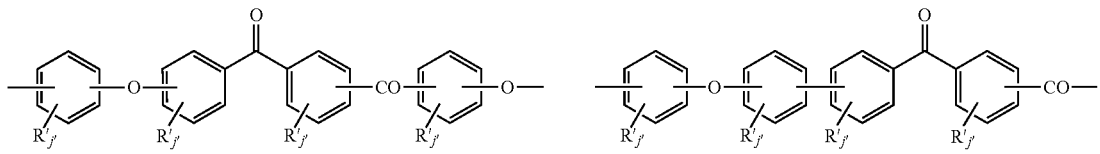

(J-M) (J-N)

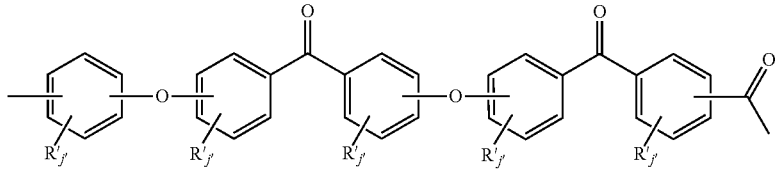 (J-O)

wherein:
    each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
    j' is zero or is an integer from 0 to 4.

In recurring unit ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK}$), j' is at each occurrence zero, that is to say that the phenylene moieties have no other substituents than those enabling linkage in the main chain of the polymer.

Preferred recurring units ($R_{PAEK}$) are thus selected from those of formulae (J'-A) to (J'-O) herein below:

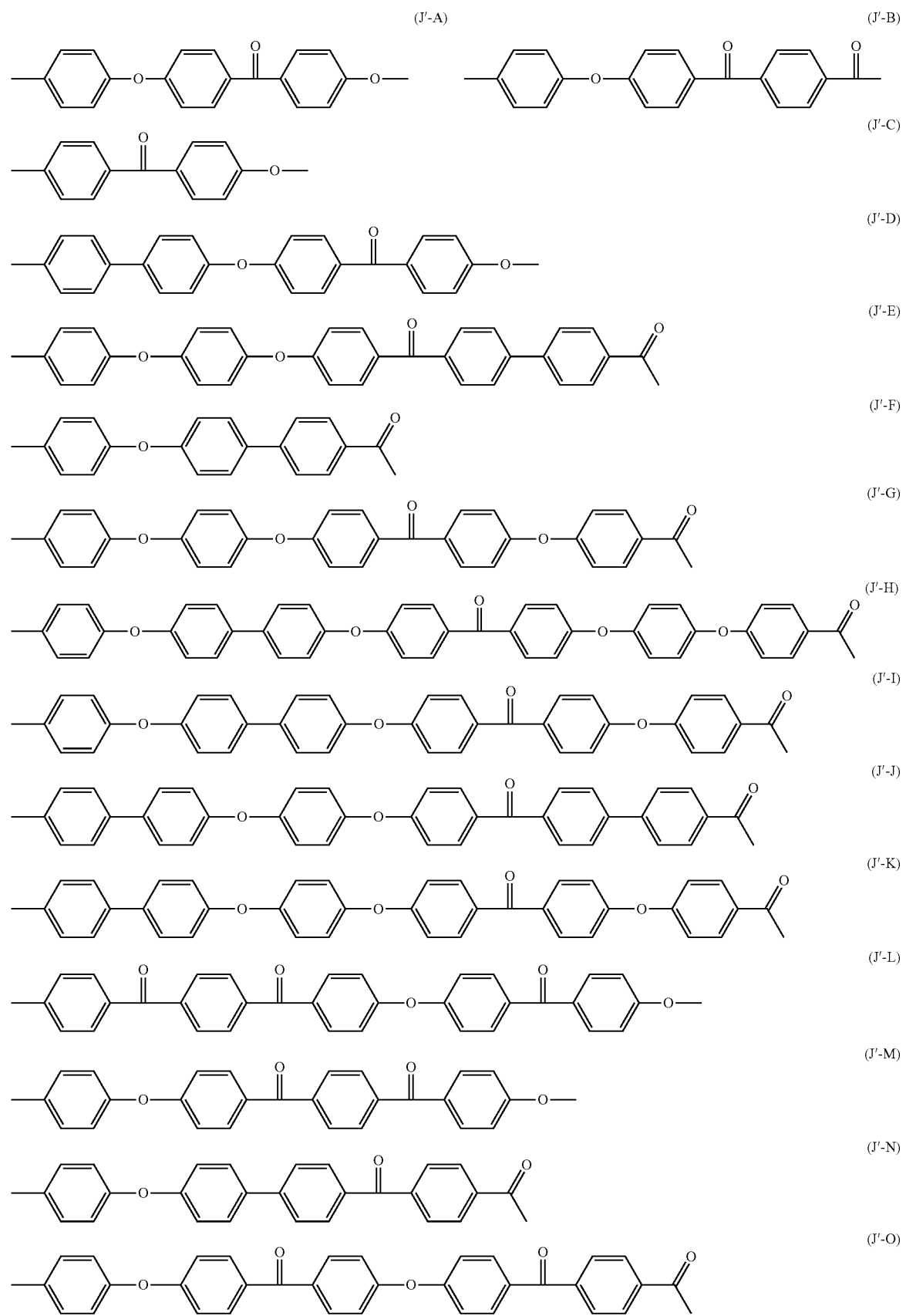

Polyaryletherketones (PAEK) are generally crystalline aromatic polymers, readily available from a variety of commercial sources. The polyaryletherketones (PAEK) have preferably reduced viscosities in the range of from about 0.8 to about 1.8 dl/g as measured in concentrated sulfuric acid at 25 C and at atmospheric pressure.

In a preferred embodiment of the invention, at least 50% moles of the recurring units of polyaryletherketones (PAEK) are recurring units (J'-A). Preferably at least 60% moles, more preferably at least 70% moles, still more preferably at least 80% moles and most preferably at least 90% moles of the recurring units of polyaryletherketones (PAEK) are recurring units (J'-A). Excellent results were obtained when the polyaryletherketones (PAEK) contained no recurring unit other than recurring units (J'-A).

In another preferred embodiment of the invention, at least 50% moles of the recurring units of polyaryletherketones (PAEK) are recurring units (J'-B). Preferably at least 60% moles, more preferably at least 70% moles, still more preferably at least 80% moles and most preferably at least 90% moles of the recurring units of polyaryletherketones (PAEK) are recurring units (J'-B). Excellent results were obtained when the polyaryletherketones (PAEK) contained no recurring unit other than recurring units (J'-B).

In yet another preferred embodiment of the invention, at least 50% moles of the recurring units of polyaryletherketones (PAEK) are recurring units (J'-C). Preferably at least 60% moles, more preferably at least 70% moles, still more preferably at least 80% moles and most preferably at least 90% moles of the recurring units of polyaryletherketones (PAEK) are recurring units (J'-C). Excellent results were obtained when the polyaryletherketones (PAEK) contained no recurring unit other than recurring units (J'-C).

Most preferably, the polyaryletherketone (PAEK) of the polymer composition (C) is polyetheretherketone (PEEK). Excellent results were obtained when using KETASPIRE® commercially available from Solvay Specialty Polymers USA, LLC.

In the polymer composition (C), the polyaryletherketone (PAEK) is present in an amount of advantageously at least 1 wt. %, at least 2 wt. %, at least 3 wt. %, at least 4 wt. %, at least 5 wt. %, at least 6 wt. %, at least 7 wt. %, at least 8 wt. %, at least 9 wt. %, at least 10 wt. %, at least 11 wt. %, at least 12 wt. %, at least 13 wt. %, at least 14 wt. %, at least 15 wt. %, at least 16 wt. %, at least 17 wt. %, at least 18 wt. %, at least 19 wt. %, at least 20 wt. %, at least 21 wt. %, at least 22 wt. %, at least 23 wt. %, at least 24 wt. %, based on the total weight of the polymer composition (C).

The polyaryletherketone (PAEK) is also present in an amount of advantageously at most 80 wt. %, at most 75 wt. %, at most 70 wt. %, at most 65 wt. %, at most 60 wt. %, at most 55 wt. %, at most 50 wt. %, at most 45 wt. %, at most 44 wt. %, at most 43 wt. %, at most 42 wt. %, at most 41 wt. %, at most 40 wt. %, at most 39 wt. %, at most 38 wt. %, at most 37 wt. %, at most 36 wt. %, at most 35 wt. %, at most 34 wt. %, at most 33 wt. %, at most 32 wt. %, at most 31 wt. %, at most 30 wt. %, at most 29 wt. %, at most 28 wt. %, at most 27 wt. %, at most 26 wt. %, based on the total weight of the polymer composition (C).

Preferably, the polyaryletherketone (PAEK) is present in an amount ranging from 2 to 45 wt. %, more preferably from 3 to 40 wt. %, still more preferably from 4 to 35 wt. % and most preferably from 5 to 30 wt. %, based on the total weight of the polymer composition (C).

The Aromatic Sulfone Polymer

For the purpose of the invention, the expression "aromatic sulfone polymer (SP)" is intended to denote any polymer, at least 50% moles of the recurring units thereof comprise at least one group of formula (SP) [recurring units ($R_{SP}$)]:

—Ar—SO$_2$—Ar'—          formula (SP)

with Ar and Ar', equal to or different from each other, being aromatic groups.

Recurring units ($R_{SP}$) generally comply with formula:

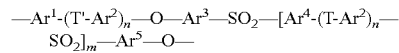

wherein:

$Ar^1$, $Ar^2$, $Ar^3$, $Ar^4$, and $Ar^5$, equal to or different from each other and at each occurrence, are independently a aromatic mono- or polynuclear group;

T and T', equal to or different from each other and at each occurrence, is independently a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —SO$_2$—, —C(CH$_3$)(CH$_2$CH$_2$COOH)—, and a group of formula:

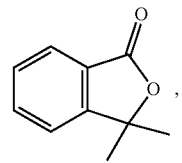

and preferably, T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

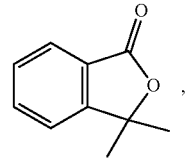

and n and m, equal to or different from each other, are independently zero or an integer of 1 to 5.

Recurring units ($R_{SP}$) can be notably selected from the group consisting of those of formulae (S-A) to (S-D) herein below:

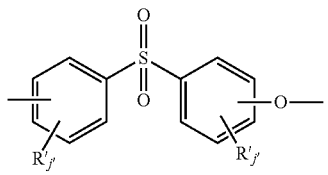 (S-A)

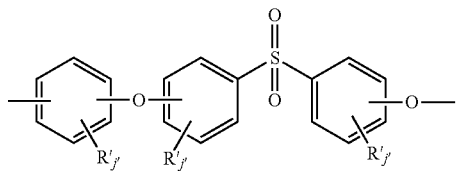 (S-B)

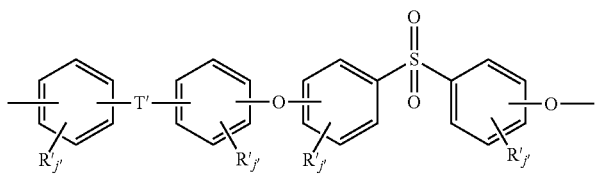 (S-C)

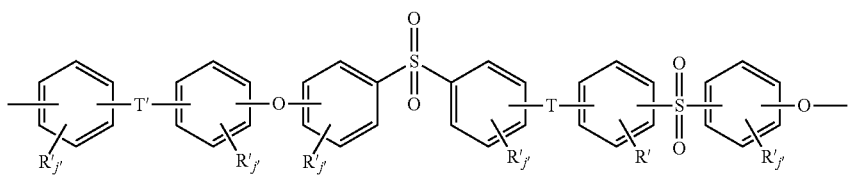 (S-D)

wherein:
  each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
  j' is zero or is an integer from 0 to 4;
  T and T', equal to or different from each other are a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

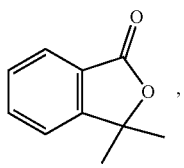

and
preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

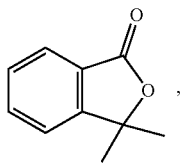

and

The aromatic sulfone polymer (P) has typically a glass transition temperature of advantageously at least 150° C., preferably at least 160° C., more preferably at least 175° C.

In a preferred embodiment of the invention, at least 50% moles of the recurring units of aromatic sulfone polymer (SP) are recurring units (R$_{SP-2}$) and/or recurring units (R$_{SP-3}$):

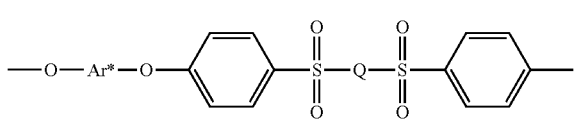 (R$_{SP-2}$)

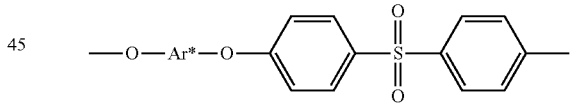 (R$_{SP-3}$)

wherein:
Q and Ar*, equal or different from each other and at each occurrence, are independently a divalent aromatic group; preferably Ar* and Q equal or different from each other and at each occurrence, are independently selected from the group consisting of the following structures:

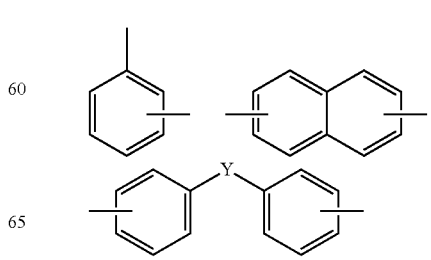

-continued

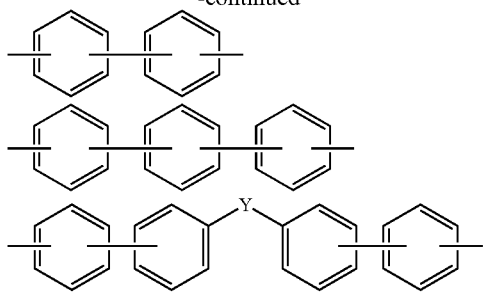

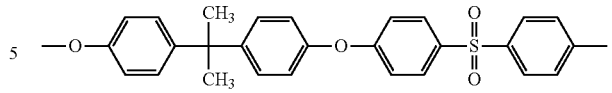

and corresponding optionally substituted structures, with Y being —O—, —CH=CH—, —C≡C—, —S—, —C(O)—, —(CH$_2$)$_n$—, —C(CF$_3$)$_2$—, —C(CH$_3$)$_2$—, —SO$_2$—, —(CF$_2$)$_n$—, with n being an integer from 1 to 5 and mixtures thereof; and mixtures thereof.

Recurring units (R$_{SP-2}$) are preferably selected from the group consisting of:

and mixtures thereof.

Aromatic sulfone polymer (SP) according to the second preferred embodiment of the invention comprises at least 50% moles, preferably 70% moles, more preferably 75% moles of recurring units (R$_{SP-2}$) and/or (R$_{SP-3}$), still more preferably, it contains no recurring unit other than recurring units (R$_{SP-2}$) and/or (R$_{SP-3}$).

In a preferred embodiment of the invention, at least 50% moles of the recurring units of aromatic sulfone polymer (SP) are recurring units (j). Preferably at least 60% moles, more preferably at least 70% moles, still more preferably at least 80% moles and most preferably at least 90% moles of the recurring units of aromatic sulfone polymer (SP) are

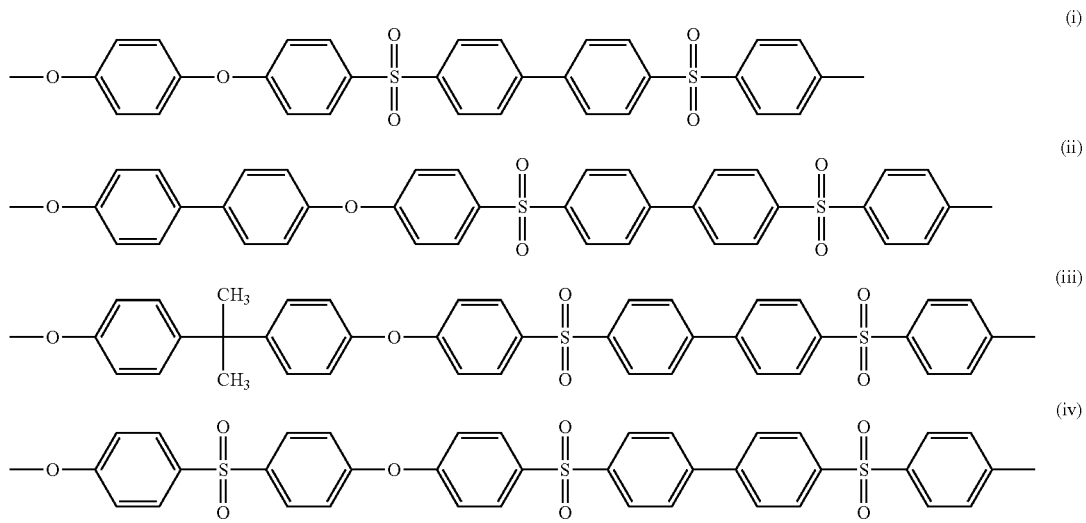

recurring units (j). Excellent results were obtained when the aromatic sulfone polymer (SP) contained no recurring unit other than recurring units (j), such a polymer (polyphenylsulfone (PPSU) hereinafter) is notably available as RADEL® PPSU commercially available from Solvay Specialty Polymers USA, L.L.C.

In another preferred embodiment of the invention, at least 50% moles of the recurring units of aromatic sulfone polymer (SP) are recurring units (jj). Preferably at least 60% moles, more preferably at least 70% moles, still more preferably at least 80% moles and most preferably at least 90% moles of the recurring units of aromatic sulfone polymer (SP) are recurring units (jj). Excellent results were obtained when the aromatic sulfone polymer (SP) contained no recurring unit other than recurring units (jj), such a polymer (polyethersulfone (PESU) hereinafter) is notably available as VERADEL® PESU, commercially available from Solvay Specialty Polymers USA, L.L.C.

In a still another preferred embodiment of the invention, at least 50% moles of the recurring units of aromatic sulfone polymer (SP) are recurring units (jv). Preferably at least 60% moles, more preferably at least 70% moles, still more preferably at least 80% moles and most preferably at least Recurring units (R$_{SP-3}$) are preferably selected from the group consisting of:

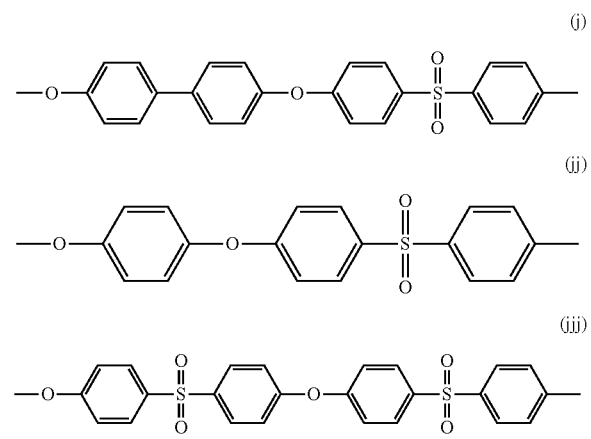

90% moles of the recurring units of aromatic sulfone polymer (SP) are recurring units (jv). Excellent results were obtained when the aromatic sulfone polymer (SP) contained no recurring unit other than recurring units (jv), such a polymer (polysulfone (PSU) hereinafter) is notably available as UDEL® PSU commercially available from Solvay Specialty Polymers USA, L.L.C.

Excellent results were obtained when the aromatic sulfone polymer (P) was selected from the group consisting of PPSU, PESU, PSU or mixture thereof.

When only one aromatic sulfone polymer (SP) is present in the polymer composition (C), it is preferably polyphenylsulfone (PPSU). When two aromatic sulfone polymers (SP) are present in the polymer composition (C), they are preferably polyphenylsulfone (PPSU) and polysulfone (PSU).

The aromatic sulfone polymer (SP) of interest have advantageously a molecular weight of at least 20000 g/mol, preferably at least 25000 g/mol, more preferably at least 30000 g/mol and most preferably of at least 35000 g/mol. They also have advantageously a molecular weight of at most 70000 g/mol, preferably at most 65000 g/mol, more preferably at most 60000 g/mol and most preferably of at most 55000 g/mol.

In the polymer composition (C), the aromatic sulfone polymer (SP) is present in a total amount of advantageously at least 10 wt. %, preferably at least 15 wt. %, more preferably at least 20 wt. %, still more preferably at least 25 wt. %, even more preferably at least 30 wt. %, still more preferably at least 35 wt. % and most preferably at least 40 wt. %, based on the total weight of the polymer composition (C).

The aromatic sulfone polymer (SP) is also present in a total amount of advantageously at most 80 wt. %, preferably at most 70 wt. %, more preferably at most 65 wt. %, still more preferably at most 60 wt. %, even more preferably at most 55 wt. %, yet more preferably at most 50 wt. % and most preferably at most 45 wt. %, based on the total weight of the polymer composition (C).

Preferably, the aromatic sulfone polymer (SP) is present in a total amount ranging from 15 to 70 wt. %, more preferably from 30 to 65 wt. %, still more preferably from 35 to 60 wt. % and most preferably from 40 to 55 wt. %, based on the total weight of the polymer composition (C).

The Reinforcing Filler

In addition to the polyaryletherketone (PAEK) and the aromatic sulfone polymer (SP) mentioned above, the polymer composition (C) also comprises at least one reinforcing filler.

A large selection of reinforcing fillers may be added to the composition (C). They are preferably selected from fibrous and particulate fillers. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5. Preferably, the aspect ratio of the reinforcing fibers is at least 10, more preferably at least 20, still more preferably at least 50.

Preferably, the reinforcing filler is selected from mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite, etc. Still more preferably, it is selected from mica, kaolin, calcium silicate, magnesium carbonate, wollastonite and glass fiber.

Preferably, the filler is chosen from fibrous fillers.

In a preferred embodiment of the present invention the reinforcing filler is chosen from wollastonite and glass fiber. Excellent results were obtained when glass fibers were used. Glass fibers are silica-based glass compounds that contain several metal oxides which can be tailored to create different types of glass. The main oxide is silica in the form of silica sand; the other oxides such as calcium, sodium and aluminium are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers, whereas chopped glass fibers are preferred. The glass fibers have generally an equivalent diameter of 5 to 20 preferably of 5 to 15 µm and more preferably of 5 to 10 µm. All glass fiber types, such as A, C, D, E, M, S, R, T glass fibers (as described in chapter 5.2.3, pages 43-48 of *Additives for Plastics Handbook*, 2nd ed, John Murphy), or any mixtures thereof or mixtures thereof may be used, however, R, S and T glass fibers are preferred, while S and T glass fibers are even more preferred. R, S and T glass fibers are high modulus glass fibers that have typically an elastic modulus of at least 76, preferably at least 78, more preferably at least 80, and most preferably at least 82 GPa as measured according to ASTM D2343.

R, S and T glass fibers are well known in the art. They are notably described in Fiberglass and Glass Technology, Wallenberger, Frederick T.; Bingham, Paul A. (Eds.), 2010, XIV. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. To the contrary of the regular E-glass fibers widely used in polymer compositions, R, S and T glass fibers comprise less than 10 wt. % of CaO.

In the polymer composition (C), the at least one aromatic reinforcing filler is present in an amount of advantageously at least 5 wt. %, preferably at least 10 wt. %, more preferably at least 15 wt. %, still more preferably at least 20 wt. %, even more preferably at least 25 wt. %, yet even more preferably at least 26 wt. %, and most preferably at least 28 wt. %, based on the total weight of the polymer composition (C).

The reinforcing filler is also present in an amount of advantageously at most 50 wt. %, preferably at most 45 wt. %, more preferably at most 40 wt. %, still more preferably at most 35 wt. %, even more preferably at most 34 wt. %, and most preferably at most 32 wt. %, based on the total weight of the polymer composition (C).

Preferably, the reinforcing filler is present in an amount ranging from 20 to 50 wt. %, more preferably from 25 to 45 wt. %, still more preferably from 26 to 40 wt. % and most preferably from 28 to 34 wt. %, based on the total weight of the polymer composition (C).

Excellent results were obtained when the reinforcing filler was chopped S-glass fibers.

Other Optional Ingredients

The polymer composition (C) may further optionally comprise additional additives such as ultraviolet light stabilizers, heat stabilizers, antioxidants, pigments, processing aids, lubricants, flame retardants, and/or conductivity additive such as carbon black and carbon nanofibrils.

The polymer composition (C) may also further comprise other polymers than the polyaryletherketone (PAEK) and the aromatic sulfone polymer (SP). In particular, the polymer composition (C) may further comprise polymers such as polyetherimide, polyphenylsulfide and/or polycarbonate.

The polymer composition (C) may further comprise flame retardants such as halogen and halogen free flame retardants.

The preparation of the polymer composition (C) can be carried out by any known melt-mixing process that is suitable for preparing thermoplastic molding compositions. Such a process is typically carried out by heating the thermoplastic polymer above the melting temperature of the thermoplastic polymer thereby forming a melt of the thermoplastic polymer. The process for the preparation of the composition (C) can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the polymer composition (C) the constituting components for forming the composition are fed to the melt-mixing apparatus and melt-mixed in that apparatus. The constituting components may be fed simultaneously as a powder mixture or granule mixer, also known as dry-blend, or may be fed separately.

The structural parts of the mobile electronic devices according to the present invention are made from the polymer composition (C) using any suitable melt-processing method. In particular, they are made by injection molding or extrusion molding. Injection molding is a preferred method.

The structural parts of the mobile electronic devices according to the present invention may be coated with metal by any known methods for accomplishing that, such as vacuum deposition (including various methods of heating the metal to be deposited), electroless plating, electroplating, chemical vapor deposition, metal sputtering, and electron beam deposition. Although the metal may adhere well to the structural parts without any special treatment, usually some well known in the art method for improving adhesion will be used. This may range from simple abrasion of the synthetic resin surface to roughen it, addition of adhesion promotion agents, chemical etching, functionalization of the surface by exposure to plasma and/or radiation (for instance laser or UV radiation) or any combination of these. Also, some of the metal coating methods comprise at least one step where the structural part is immersed in an acid bath. More than one metal or metal alloy may be plated onto the structural parts made of the polymer composition (C), for example one metal or alloy may be plated directly onto the synthetic resin surface because of its good adhesion, and another metal or alloy may be plated on top of that because it has a higher strength and/or stiffness. Useful metals and alloys to form the metal coating include copper, nickel, iron-nickel, cobalt, cobalt-nickel, and chromium, and combinations of these in different layers. Preferred metals and alloys are copper, nickel, and iron-nickel, and nickel is more preferred. The surface of the structural part may be fully or partly coated with metal. Preferably more than 50 percent of the surface area will be coated, more preferably all of the surface will be coated. In different areas of the structural part the thickness and/or the number of metal layers, and/or the composition of the metal layers may vary. The metal may be coated in patterns to efficiently improve one or more properties in certain sections of the structural part.

An aspect of the present invention is directed to mobile electronic devices comprising at least one structural part made of a polymer composition (C) as above described, and in particular to a laptop, a mobile phone, a GPS, a tablet, personal digital assistants, portable recording devices, portable reproducing devices and portable radio receives.

Should the disclosure of any patents, patent applications, and publications which are incorporated herein by reference conflict with the description of the present application to the extent that it may render a term unclear, the present description shall take precedence.

The invention claimed is:

1. A mobile electronic device comprising at least one structural part made of a polymer composition, comprising:
    at least one polyaryletherketone;
    at least one aromatic sulfone polymer having recurring units ($R_{SP-3}$) of:

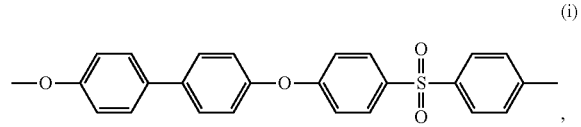

and/or

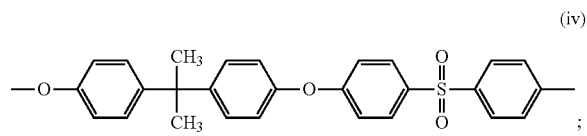

and
    at least one reinforcing filler,
    wherein the structural part is selected from a housing for the mobile electronic device, or a frame around the periphery of the mobile electronic device.

2. The mobile electronic device according to claim 1, wherein the at least 50 mole % of the recurring units of polyaryletherketones are the recurring units (J'-A):

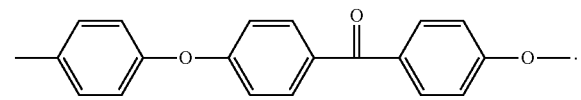

3. The mobile electronic device according to claim 1, wherein the polyaryletherketone is present in an amount of at least 2 wt. %, based on the total weight of the polymer composition.

4. The mobile electronic device according to claim 1, wherein the polyaryletherketone is present in an amount of at most 40 wt. %, based on the total weight of the polymer composition.

5. The mobile electronic device according to claim 1, wherein the aromatic sulfone polymer is polyphenylsulfone, polyethersulfone, polysulfone, or a mixture thereof.

6. The mobile electronic device according to claim 1, wherein the at least one aromatic sulfone polymer is present in an amount of at least 20 wt. %, based on the total weight of the polymer composition.

7. The mobile electronic device according to claim 1, wherein the at least one aromatic sulfone polymer is present in an amount of at most 80 wt. %, based on the total weight of the polymer composition.

8. The mobile electronic device according to claim 1, wherein the reinforcing filler is a fibrous reinforcing filler.

9. The mobile electronic device according to claim 8, wherein the fibrous reinforcing filler is S glass fiber.

10. The mobile electronic device according to claim 1, wherein the reinforcing filler is present in an amount of at least 20 wt. %, based on the total weight of the polymer composition.

11. The mobile electronic device according to claim 1, wherein the reinforcing filler is present in an amount of at most 40 wt. %, based on the total weight of the polymer composition.

12. The mobile electronic device according to claim 1, wherein the device is a laptop, a mobile phone, a GPS, a tablet, a personal digital assistant, a portable recording device, a portable reproducing device, or a portable radio receiver.

13. The mobile electronic device according to claim 12, wherein the device is a mobile phone.

* * * * *